(12) United States Patent
Estève et al.

(10) Patent No.: US 9,342,192 B2
(45) Date of Patent: *May 17, 2016

(54) METHOD AND A TOUCH SENSING DEVICE FOR IMPLEMENTING THE METHOD

(75) Inventors: Simon Estève, Rambouillet (FR); Olivier Schevin, Paris (FR)

(73) Assignee: Elo Touch Solutions, Inc., Milpitas, CA (US)

( * ) Notice: Subject to any disclaimer, the term of this patent is extended or adjusted under 35 U.S.C. 154(b) by 387 days.

This patent is subject to a terminal disclaimer.

(21) Appl. No.: 13/995,412
(22) PCT Filed: Dec. 22, 2011
(86) PCT No.: PCT/EP2011/006530
§ 371 (c)(1), (2), (4) Date: Jul. 23, 2013
(87) PCT Pub. No.: WO2012/084256
PCT Pub. Date: Jun. 28, 2012

(65) Prior Publication Data
US 2013/0300718 A1 Nov. 14, 2013

(30) Foreign Application Priority Data
Dec. 22, 2010 (EP) .................................. 10290673

(51) Int. Cl.
*G06F 3/043* (2006.01)
(52) U.S. Cl.
CPC ............ *G06F 3/0436* (2013.01); *G06F 3/0433* (2013.01)
(58) Field of Classification Search
CPC ....................................................... G06F 3/048
See application file for complete search history.

(56) References Cited

U.S. PATENT DOCUMENTS 7,411,581 B2   8/2008   Hardie-Bick
2006/0139339 A1   6/2006   Pechman et al.

(Continued)

FOREIGN PATENT DOCUMENTS

CN   101095100 A   12/2007
CN   101339478 A   1/2009

(Continued)

OTHER PUBLICATIONS

International Search Report for Application No. PCT/EP2011/006530, dated Apr. 3, 2012.
International Preliminary Report on Patentability and Written Opinion of the International Searching Authority directed to related International Patent Application No. PCT/EP2011/006530, issued Jun. 25, 2013; 5 pages.

*Primary Examiner* — Gerald Johnson
*Assistant Examiner* — Maheen Javed
(74) *Attorney, Agent, or Firm* — Sterne, Kessler, Goldstein & Fox P.L.L.C.

(57) ABSTRACT

The present invention relates to a method for determining an acoustic response attributed to a location of an impact, in particular a touch event, on a surface of an object including at least one transducer comprising the steps of: Injecting a predetermined acoustic bending wave by the transducer at the transducer position (5a, 5b), Sensing a bending wave parameter at a secondary location (11) on the surface different to the transducer position, determining the acoustic response based on the sensed bending wave parameter and properties of the predetermined acoustic bending wave effectively as if the injection took place at the at least one secondary location (11) on the surface different to the transducer position and the sensing took place at the transducer position based on reciprocity principles, and determining the acoustic response attributed to at least one location (9) on the surface different to the at least one secondary location (11) on the surface different to the transducer position based on at least two different acoustic responses determined in step c).

18 Claims, 4 Drawing Sheets

(56) References Cited

U.S. PATENT DOCUMENTS

| | | |
|---|---|---|
| 2007/0188476 A1* | 8/2007 | Bayramoglu ......... G06F 3/0433 345/177 |
| 2008/0062151 A1 | 3/2008 | Kent |
| 2008/0284755 A1 | 11/2008 | Hardie-Bick |
| 2008/0316184 A1 | 12/2008 | D'Souza |
| 2009/0008160 A1 | 1/2009 | Aroyan et al. |
| 2009/0195518 A1 | 8/2009 | Mattice et al. |
| 2011/0310028 A1* | 12/2011 | Camp, Jr. .............. G06F 3/0436 345/173 |

FOREIGN PATENT DOCUMENTS

| | | |
|---|---|---|
| TW | 200910171 A | 3/2009 |
| WO | WO-2006/015888 A1 | 2/2006 |
| WO | WO-2006/069596 A1 | 7/2006 |
| WO | WO-2008/146098 A1 | 12/2008 |

* cited by examiner

METHOD AND A TOUCH SENSING DEVICE FOR IMPLEMENTING THE METHOD

The present invention relates to a method for determining an acoustic response attributed to a location of an impact, like a touch event on a surface of an object, and a touch sensing device implementing the method.

Figure 1:
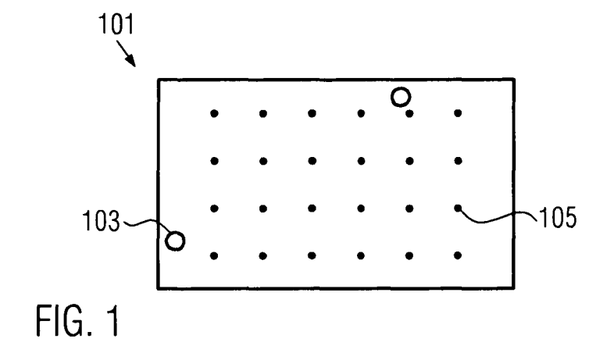
FIG. 1 illustrates a two-dimensional schematic view of a touch sensing device, as known from the prior art, comprising an interaction surface, wherein locations on the surface of the touch sensing device at which acoustic responses are acquired are shown (in points)

Methods to determine the location of an impact on a surface of an object based on analysing acoustic signals are already known in the art. This kind of technology is based on measuring the acoustic signal using one or more sensors to obtain an acoustic signature of the impact and to compare the signature with a predetermined set of acoustic signatures, wherein each predetermined acoustic signature is representative for a given location of the haptic or tactile interface. The location of the impact is then identified based on the similarity of its acoustic signature with one of the predetermined acoustic signatures. FIG. 1 schematically illustrates such a prior art device with an interaction surface 101 and two transducers 103.

The predetermined set of acoustic signatures, which can be in the form of a lookup table or a database, is generated by computing the individual acoustic pattern of closely spaced locations 105 on the surface of a haptic interface during the calibration of the device. The lookup table is generated by an automated process, e.g. using a robotized bench. The robot used is equipped with a shaker and a metal tip, and performs impacts of a predetermined force and shape on each location sequentially. An acoustic signature for a given location is thus built up from the acoustic responses determined out of the measured acoustic signals which are received by the at least one sensor after an impact at the location. An acoustic signature is unique to the location of the impact. The acoustic response is a function of frequency that represents the response of a haptic interface when subjected to a mechanical excitation. The acoustic response can be a transfer function, that represents the relation between the mechanical excitation and a sensor's output.

WO 2006/015888 A1 simply proposes to store the measured signals of the calibration stage. WO 2006/069596 A1 proposes to determine acoustic signatures based on correlation of the phases of two acoustic signals received by acoustic sensors when a reference impact occurs on a predetermined area of the interaction interface.

In particular, for touch screen applications, the generation of the lookup table takes a lot of time as typically several thousands of acoustic responses need to be acquired to cover the whole haptic area with a sufficient resolution. Furthermore, each product needs to be calibrated individually as, due to the tolerances accepted during the manufacturing process of the object with the haptic surface, one established lookup table cannot necessarily be applied from one object to the next one. Due to the complexity of certain objects, at least in their integrated state, a purely theoretical approach to the creation of the lookup tables, like proposed by WO 2006/015888, is not always possible.

One way to reduce the calibration time in the industrialized process could be to use a plurality of calibration stations using robotized benches. Due to the relatively high cost of these benches, the calibration process represents a high investment. Reducing the manufacturing tolerances, on the other hand, would also lead to an unacceptable rise of costs.

It is therefore the first object of the present invention to provide a method for determining an acoustic response at any location of an impact on a surface of an object and a touch sensing device implementing the method with which the predetermined set of acoustic signatures can be obtained faster.

Furthermore, it appeared that, due to wear, scratches, aging, temperature variations, integrations drifts or other known or unknown effects, an object with a tactilized surface changes such that the original lookup table with the predetermined acoustic signatures no longer provides satisfying results. As a consequence, a recalibration of the set of acoustic signatures needs to be carried. This could be done using the robotized benches. This does not, however, correspond to a very practical solution.

WO2008/146098 A1 proposes a method to take into account environmental variations that can slightly change the size of the sensor. The thickness of an object has in fact an impact on the wave propagation. In WO2008/146098 A1, a contraction/expansion algorithm is proposed which contracts or extends the acoustic responses in the frequency space to take into account a change in thickness to improve the localization results. Whereas this method appeared to provide satisfying results for this special class of variations, it cannot deal with more complex changes to the object.

It is therefore a second object of the invention to provide a method for determining an acoustic response at a location of an impact on a surface of an object such that a recalibration of the predetermined set of acoustic signatures can be carried out in a simplified way.

The first object is achieved with a method for determining an acoustic response attributed to a location of an impact, in particular a touch event, on a surface of an object including at least one transducer comprising the steps of: a) injecting a predetermined acoustic bending wave by the transducer at the transducer position (5a, 5b), b) Sensing a bending wave parameter at a secondary location on the surface different to the transducer position, and c) determining the acoustic response based on the sensed bending wave parameter and properties of the predetermined acoustic bending wave effectively as if the injection took place at the at least one secondary location (11) on the surface different to the transducer position and the sensing took place at the transducer position based on reciprocity principles, and d) determining the acoustic response attributed to at least one location on the surface different to the at least one secondary location (11) on the surface different to the transducer position based on at least two different acoustic responses determined in step c).

It is the finding of this invention that acoustic responses for a given location can be determined out of experimental data which relates to other different locations. This greatly simplifies the calibration of a touch sensitive surface of an object, as the number of real impacts on the surface during calibration can be reduced.

In this context, an impact in particular relates to a touch event, like a touch by one or more of a users fingers or a dragging action over the surface of an object, e.g. a touch screen device.

Furthermore, the object can be any kind of object made out of any kind of material or material mix as long as acoustic waves can be transmitted and out of any shape. For instance, the object can be made out of glass, plastic, wood, metals, etc. and the shape can be a flat panel or a curved panel and, in general, any 3D shape from simple to complex.

Preferably step a) can comprises injecting a bending wave by the transducer, sensing a bending wave parameter at the secondary location on the surface different to the transducer position and reconstructing the excitation signal using reciprocity principles.

In this context, a transducer corresponds to any means that transforms an acoustic signal into another kind of signal, e.g. an electric signal. For instance, a piezoelectric transducer can be used to carry out the invention. The term "acoustic" relates to frequencies of up to 100 kHz, in particular up to 40 kHz, more in particular up to 20 kHz.

Thus the method takes advantage of the presence of the transducers to provide a bending wave, so that the robotized working bench like used in the prior art is no longer necessary. Indeed, by applying a driving or actuating signal with the desired properties at the position of the transducer, the resulting vibrations at the secondary location on the surface different to the transducer position can be measured. Applying reciprocity principles known in the art, for which the sensing part, here at the secondary location on the surface different to the transducer position becomes the virtual emitting part, and the original emitting part, the transducer at the transducer position, virtually become the sensing part, a signal can be established that corresponds to the one which would have been sensed by the transducer in case an excitation would have been provided at the secondary location on the surface different to the transducer position.

Advantageously, the step of injecting a bending wave can comprise providing a plurality of bending waves with different frequencies within a predetermined frequency range and sensing signals for each one of the bending waves with different frequencies. In this case it is possible to determine the measurement data in the frequency domain, which facilitates subsequent data treatment, as for touch location algorithms, the acoustic signatures are usually stored in the frequency domain, e.g. to compute phase differences between transfer functions for two different transducer positions.

Preferably, step b) f the method can comprise sensing the bending wave parameter at the secondary location on the surface different to the transducer position with a vibrometer. The vibrometer, e.g. a laser vibrometer, an atomic force microscope or more general any means capable of measuring surface motion, enables the measurement of the resulting height of deflection of the objects surface as a function of the position of the measurement and the frequency of the injected bending wave.

According to one further aspect of the invention, steps a) to c) can be carried out for two or more transducers positioned at different transducer positions. Thus, in this variant, the at least two different acoustic responses necessary to carry out the invention are obtained by the presence of at least two transducers injecting bending waves, the parameters of which are then measured at the secondary location different to the transducer positions.

For a plurality of transducers steps a) to c) can be carried out one after the other or at the same time. If step c) is realized for a plurality of transducers at the same time, the individual responses can be determined when signals that are uncorrelated with respect to each other have been injected by the transducers.

According to a variant, steps a) to c) are carried out for at least two locations on the surface. Thus the acoustic responses in step c) are reconstructed for at least two different locations on the surface with respect to one given transducer position.

Of course both variants can be combined, thus use of more than one transducer and use of more than one location at which excitations are exerted on the surface. The amount of different acoustic responses used in step c) will also depend on the precision of the acoustic responses determined during step c), one wants to obtain.

Preferably, steps a) to c) can be realized for a location that is positioned in a border region of the surface of the object, in particular in the border region of a part of the surface of the object serving as a touch sensitive input area or even outside that area. Typically, on an object, only a part of the surface will be used as a touch sensitive input area, e.g. the screen part of a handheld electronic device. In this case, means for measuring the parameters of the bending wave can be positioned such that they are away from the area of interest, e.g. hidden in the frame region of a screen. Thus, the means for measuring can actually remain within the object, and be used not only during calibration but eventually also for recalibrating.

Advantageously, the method can further comprise a step d) of determining acoustic responses at a plurality of locations on the surface different to the at least one secondary location on the surface different to the transducer position based on the acoustic response determined in step b). Thus with only a limited amount of reconstructed excitations/impacts, acoustic responses can be determined for the whole surface of interest of the object.

Preferably, the method can further comprise a step e) of: gathering the acoustic responses determined at a plurality of locations on the surface different to the secondary locations on the surface different to the transducer position in step d) to form a lookup table. Thus the method can be used to establish a set of predetermined acoustic responses as described above in a faster but still reliable way compared to the prior art using only a limited number of real impacts. The lookup table comprises data characterizing the surface of the object and is used during the touch event localization process once the calibration process of the surface has established the set of predetermined acoustic responses. As only a limited number of real excitations is necessary to obtain the lookup table for the surface of the object, an individual lookup table can be created for each product. This lowers the integration constraints as any deviations from product to product are individually taken into account.

Advantageously, the method can further comprise a step f) of selecting only acoustic responses, determined during step b) for carrying out step c), that satisfy predetermined criteria, in particular, concerning at least one of, signal-to-noise ratio, coherence of the measurements. These criteria are frequency based, thus enable a motivated choice to select a frequency range for which the acoustic responses are of good quality. This additional step brings the advantage that the quality of the acoustic responses determined during step c) can be further improved.

According to a preferred embodiment, the method can comprise the steps g) of determining a first representative function based on the distance between an auxiliary location, which is positioned away from the secondary location on the surface different to the transducer position and the locations on the surface different to the secondary location, and the location on the surface different to the secondary location; h) determining a second representative function based on the distance between the auxiliary location and the secondary location; i) computing the ratio between the first representative function determined in step g) and the second representative function determined in step h); j) repeating step g) for each location on the surface different to the secondary location and for each auxiliary location; and k) repeating step h) for each secondary location. This method based on wave superposition enables a fully numerical way of determining the desired acoustic responses for locations on the surface that are positioned away from the secondary locations.

Preferably, the auxiliary locations can be outside the surface and away from each secondary location and away from each location on the surface different to each secondary location on the surface different to the transducer position. Indeed, by providing the auxiliary locations outside, the algorithm allows to determine the acoustic properties inside the auxiliary locations.

The second object of the invention is achieved with the method comprising, in addition to the method steps of claim 1, a further step i) of repeating at least steps a) to d), in particular on demand and/or upon detection of particular circumstances and/or on a regular basis.

By repeating at least steps a) to d) from time to time it becomes possible to identify changes in the acoustic response and thus also in the set of predetermined acoustic signatures which are necessary to identify the location of an impact exerted by a user on the tactilized surface of the object which can thus serve as a touch sensitive interface. By simply re-determining an acoustic response between a transducer position and a secondary location according to steps a) to c) of claim 1, the method allows recalibrating the acoustic responses of all locations on the surface and effects like wear, scratches, aging, temperature, etc. are taken into account. As a re-calibration takes into account the properties of the object at the moment of re-running the calibration, the precision of the updated acoustic response is better than a process which simply corrects the database by a correction factor. The re-calibration can be automated or on demand, e.g. when a user realizes that the identified locations differ from the real locations.

Advantageously, the method can further comprising a step m) of comparing the acoustic response with a previously determined acoustic response corresponding to that location on the surface, in particular, the acoustic response corresponding to that location on the surface of the lookup table. By keeping a trace of the changes, it will be possible to identify sources of change of the acoustic response.

Preferably, the secondary locations can be chosen such that the spacing $\lambda$ between two neighbouring second locations satisfies the relation $\lambda \leq 1.2$ A, wherein A is $$\frac{2\pi}{\sqrt{\omega}} \left[ \frac{12(1-v^2)\rho}{Eh^2} \right]^{-1/4},$$

$\omega$ is the angular frequency of the acoustic signals, in particular the highest frequency of interest, from the transducers, E, v, $\rho$ and h are properties of the object, being respectively the modulus of elasticity, the Poisson's ratio, the density and the thickness. Even further preferred, the secondary locations can be provided such that the spacing $\lambda$ satisfies the relation $0.5$ A$\leq \lambda \leq 1.2$ A, in particular, $0.9$ A$\leq \lambda \leq 1.0$ A. In this range, optimized results with respect to performance, thus accuracy of the determined acoustic responses in step d) and the duration of acquisition, can be achieved.

Advantageously, the secondary locations can be provided such that the number of secondary locations on the surface different to the transducer position per wavelength, in particular per minimum wavelength of interest, of the acoustic signal is more than one, preferably, between three and six. In this range, optimized results with respect to performance, thus accuracy of the determined acoustic responses in step d) and the duration of acquisition, can be achieved. Here, the minimum wavelength is of course linked to the maximum frequency of interest defined above.

In the context of the invention, the term "the highest frequency of interest" is linked to the ability of a touch event (i.e. touch, drag) to input vibratory energy into the tactile object. Frequencies for which no energy can be injected by a user do not need to be considered to build a lookup table. Typically, the frequency limit is set to about 20 kHz. However, to further improve the results one may even consider frequencies of up to 40 kHz or even up to 100 kHz.

According to a preferred embodiment, the at least one transducer can be located on the axes of symmetry of the surface of the object. In particular, in case the surface is shaped to be rectangular, the at least one transducer can be located on at least one axes of symmetry of the rectangular surface and the secondary locations are provided at locations of every second quadrant of the rectangular surface only. By doing so, it is possible to take advantage of the special properties of the object and the amount of locations where measurements have to be carried out in step b) can be reduced. Thus, again, the amount of time required to acquire the associated acoustic responses can be reduced. For other shapes, the situation is similar. At least one transducer has to be provided per symmetry axis and an amount of excitations or measurements needs to be determined for which it is possible to achieve the desired resolution for the acoustic responses determined during step d).

Advantageously, the secondary locations on the surface different to the transducer position can be randomly arranged. By breaking a regular organization of locations at which measurements are taken, fictive resonances which may occur during the numeric analysis of the data can be overcome.

Advantageously, the secondary locations on the surface different to the transducer position can be formed in at least two rows, in particular, such that the spacing between the locations in a first row are different with respect to the spacing between the locations in a second row. Preferably, the smaller spacing is on the outer row with respect to the surface of interest. Further preferred, the outer row has at least four times more locations at which excitations are applied. This has the advantage that again fictive resonances can be avoided.

The object of the invention is also achieved with a computer readable medium including computer executable instructions stored thereon for performing the method as described above. With this medium the same advantageous as described above can be achieved.

The invention also relates to a touch sensing device comprising an interaction surface; at least one transducer; and a control means to carry out the method as described above. Thus, with this device, the acoustic response of a certain location necessary to obtain the set of predetermined acoustic signatures as mentioned in the introduction, can be determined out of reconstructed data which relates to other, different locations. This greatly simplifies the calibration of a touch sensitive surface of an object, as the number of measurements on the surface during calibration can be reduced.

Preferably, the control means can be configured to inject acoustic signals by at least two transducers and the acoustic signals are determined out of the measured values at the at least one secondary location on the surface or the control means can be configured to inject acoustic signals by the at least one transducer and the measurements are carried out at at least two secondary locations on the surface.

Preferably, the control means can be configured to determine acoustic responses at a plurality of locations on the surface different to the at least one secondary location on the surface different to the transducer position based on the received acoustic response. Thus, the entire object, or at least the part of it which shall provide a touch sensitive interface can be analyzed and acoustic response data be provided by using the reconstructed data simulating some real excitations somewhere on the surface of the object.

According to one advantageous embodiment, the control means can be configured to gather the acoustic responses determined at a plurality of locations on the surface different to the secondary locations on the surface different to the transducer position to form a lookup table corresponding to the locations on the surface. The input data to carry out the analysis relates to the experimental data of the injected and measured wave properties. Using this data, it is possible to determine the acoustic responses for as many locations as necessary for the applications to be carried out by the device and its touch sensitive surface. In particular, it is possible to adapt the resolution by simply calculating the acoustic responses in step c) of the method for more locations. This only requires additional calculation time and no new experimental data.

Preferably, the device can further comprise a re-calibration unit for re-determining an acoustic response, in particular on demand and/or upon detection of particular circumstances and/or on a regular basis. The re-calibration unit is thus configured to repeat at least steps a) to d) of the method from time to time to identify changes in the acoustic response. Thus, also the set of predetermined acoustic signatures can be updated. Therefore negative effects like scratches, wear, aging, temperature, etc. can be taken into account effectively so that the touch sensitive device's lifetime can be extended.

According to a preferred embodiment, the re-calibration unit can be configured to compare the acoustic response of the lookup table corresponding to the location on the surface to the one of the newly determined acoustic response. Thus the entire lookup table which comprises the acoustic signatures can be corrected for any changes to the acoustic properties but, at the same time, a trace is kept of the changes to be able to identify the source of any updates, e.g. whether they are global or only localized.

Further preferred, the re-calibration unit can comprise at least one sensor, in particular a vibrometer or piezoelectric transducer, at one secondary location such that the wave parameter can be determined at the secondary location on the surface different to the transducer position following the injection of bending waves by the transducer.

Preferably, the at least one sensor can be positioned at the border of a region of interest of the surface of the object. Typically on an object only a part of the surface will be used as a touch sensitive input area, e.g. the screen part of a handheld electronic device. In this case, the sensor can be positioned such that it is away from the area of interests, e.g. hidden in the frame region of a screen, to not jeopardize the user friendliness of the device. Another advantage is that the at least one sensor can actually remain within the object, and be used for calibration to first establish the acoustic responses for the initial lookup table and later also for recalibrating the set of predetermined acoustic responses.

Advantageous embodiments of the inventive method and the device will be described in the following by referring to the Figures.

In the following, features and advantageous embodiments of the method and the device according to the invention will be described in detail.

Figure 2:
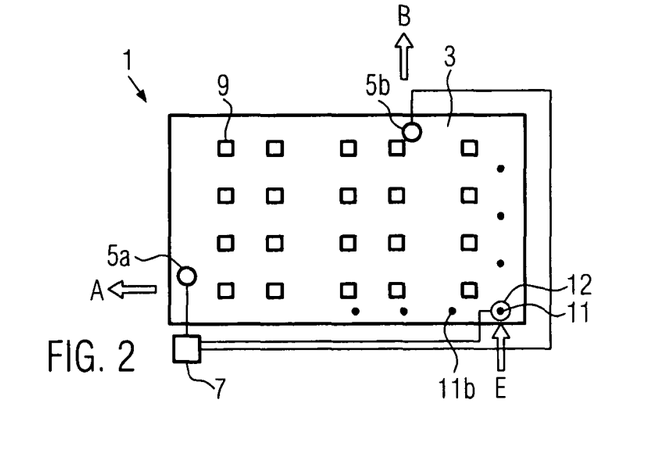
FIG. 2 illustrates a two-dimensional schematic view of a touch sensing device according to a first embodiment of the invention, comprising an interaction surface, wherein locations on the surface of the touch sensing device for which acoustic responses are experimentally acquired are shown (in points)

FIG. 2 illustrates a two-dimensional schematic view of a touch sensing device 1 using the method for determining an acoustic response at a location of an impact on the surface according to the invention. The touch sensing device 1 comprises an interaction surface 3, and at least one transducer 5. In this embodiment, the device comprises two transducers 5a, 5b, e.g. piezoelectric transducers, capacitive piezoelectric transducers, magnetostrictive piezoelectric transducers, electromagnetic piezoelectric transducers, acoustic velocimeters, accelerometers, optical sensors, microelectromechanical system (MEMs) sensors or any device capable of transforming an acoustic signal into an electric one. The coupling between the transducer 5 and the interaction surface 3 is achieved by a fastening device that can be tape, glue, or the like. The invention can also be carried out with only one transducer or more than two. The touch sensing device is configured to identify the location of a touch event, an impact, a dragging over the surface, and to provide this information to control inputs to an electronic device, like a handheld electronic device, a computer or any kind of machine with a touch sensitive interface. This functionality can be provided by a control means 7.

To do so, the control means 7 analyzes the acoustic signals received from the transducer 5a, 5b and an acoustic signature is determined. By comparing this signature with a set of predetermined signatures stored in a lookup table, the location of the impact on the interaction surface 3 is obtained.

The invention overcomes the problems in the art which relate to the creation of the predetermined acoustic signatures as described in the introductory part and which mainly relate to the fact that each location on the interaction surface 3, has to be characterized by applying excitations to the interaction surface at a plurality of locations 9 located all over the interaction surface 3.

In this invention, the control means 7 is configured to determine the acoustic responses which are necessary to determine acoustic signatures, at the locations 9 based on at least one measurement E at a secondary location 11 different to the locations 9. To do so the control means 7 instructs the transducer 5a or 5b to inject a bending wave into the interaction surface 3 and receives a measurement signal from a vibration measuring device 12, e.g. a non contact laser interferometer, or an atomic forces microscope serving as vibrometer. Based on the measured data and the known properties of the injected bending wave reciprocal principles an acoustic signal S can be reconstructed effectively as if it was received from a transducer 5a or 5b in response to an excitation E at location 11. Based thereon, the control unit is configured to determine acoustic response A concerning the first transducer 5a and acoustic response B concerning the second transducer 5b being representative of the acoustic behaviour of interface 3 when an external excitation is applied at location 11. Thus, when determining the acoustic responses the role of emitter and sensor is exchanged compared to the situation when the data is measured.

In the embodiment with only one transducer, a second measurement at a different secondary location 11b than the secondary location 11 illustrated in FIG. 2 needs to be acquired to get sufficient information about the object 1. Of course, to improve precision, even more measurements at different secondary locations (illustrated by dots in FIG. 2) outside locations 9 should be made.

Figure 3:
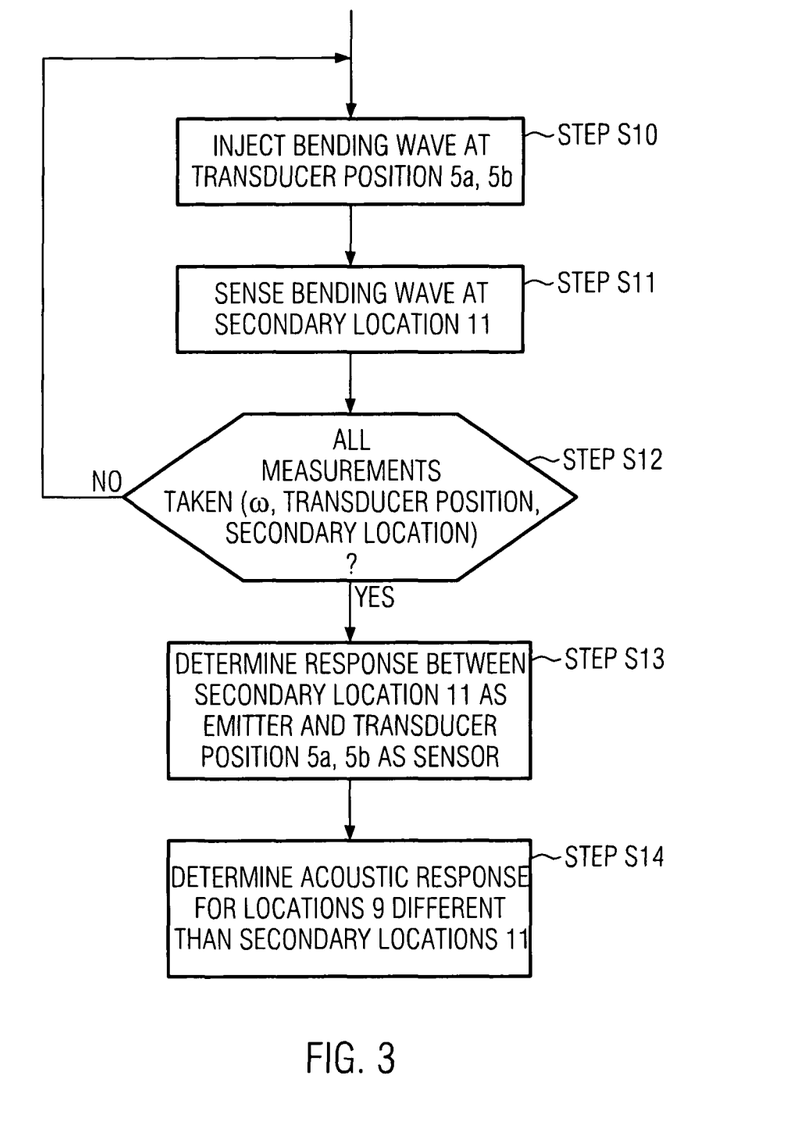
FIG. 3 illustrates the main steps involved in a method for determining an acoustic response attributed to a location of an impact on the surface of the touch sensing device of the first embodiment of FIG. 2.

FIG. 3 illustrates the concept of the corresponding method for determining the acoustic response attributed to a location 9 of an impact on the interaction surface 3 of the touch sensing device 1 according to the first embodiment.

FIG. 3 illustrates the process for determining the acoustic responses attributed to location 9 with respect to the transducers, based on the acoustic responses A and B.

During step S10, the control unit 7 provides a driving or actuating signal to transducer 5a to inject a bending wave of frequency ω into the interaction surface 3. Then during Step S11, the vibration measuring device, e.g. a vibrometer, measures the resulting vibrations at location 11, which can e.g. be the resulting height of deflection of the surface of the object 1.

Steps S10 and S11 are repeated for a plurality of frequencies within a predetermined frequency range, in particular within up to 100 kHz, preferably up to 40 kHz, even further preferred 20 kHz. Furthermore steps S10 and S11 are repeated for the different transducer positions and the various secondary locations. When the predetermined amount of measurements has been achieved (see decision taking in step S12), the process continues with determining acoustic responses.

According to a variant, instead of an iterative approach, the signals could be injected from the transducers at the same time, in case the injected signals are uncorrelated.

Based on the set of measured signals and on the above mentioned reciprocal principles the acoustic responses between the secondary locations 11 and the transducer positions 5a, 5b are determined, as if the emitter would have been at location 11 and as if the receiver would have been at the transducer position. Here the term acoustic response relates to the vibration (displacement, velocity, acceleration) of the surface resulting from an excitation forcing (normal force or bending moment). Thus based on the known properties of the injected wave and the measured properties, the acoustic responses or transfer functions are determined in step S13.

Step S14 then consists in determining the acoustic responses for each location 9 on the surface 3 different to the secondary locations 11 based on the acoustic responses determined in step S13. The acoustic responses at the plurality of locations 9 on the surface 3 different to the secondary locations 11 are then gathered and stored in a lookup table to form the set of predetermined acoustic signatures used to determine touch locations during normal operation of the device.

In the following, one practical way to carry out this method according to the invention is described. This embodiment is based on the so called wave superposition method (WSM) which is a numerical technique for acoustic field reconstruction in radiation and scattering problems. The main idea is that an acoustic cavity can be replaced by a finite number of elementary sources of excitation. These sources are located inside the cavity if the acoustic domain to characterize is outside, and outside if the acoustic domain to characterize is inside. Thus, the acoustic field of interest is obtained by the summation of the fields of each elementary source.

The starting point of the WSM is the following equation:

$$p(r) = j\rho\omega \int_E q(r_s)G(r, r_s) dE(r_s) \quad (1)$$

where ρ is the density of the propagation medium and ω is the angular frequency. The source is denoted q, and its position $r_s$ is part of the domain E. G is the free field Green's function, which, in this case, can be written as follows:

$$G(x) = \frac{1}{\sqrt{x}} e^{ikx} \quad (2)$$

To convert the analytical equation above to its numerical form, the sources are distributed in a thin shell (3D) or on a continuous contour (2D). By discretizing this geometrical entity in N small segments, normal velocity can be approximated on the surface of the cavity:

$$u_n(r) \approx \sum_{i=1}^{N} Q_i \nabla_n G(r_s, r) \quad (3)$$

where $Q_i$ is the volume velocity of a elementary source. Since $u_n$ is known, $Q_i$ can be written in matrix form as:

$$Q = [D]^{-1} u_n \quad (4)$$

with D corresponding to nabla G. We finally get the expression of the acoustic field:

$$p(r) = j\omega\rho \sum_{i=1}^{N} G(r_s, r) Q_i \quad (5)$$

Based thereon, one can determine acoustic responses following the method steps of FIG. 3, in particular during Step S14 at locations 9 which are away from secondary locations of measurements.

To do so, the method first requires the following input parameters: The locations 9 on the interaction surface 3 for which the acoustic responses and then the acoustic signatures are stored in the lookup table or a database. For sake of clarity these locations 9 will be called database locations in the following. Preferably, they cover essentially the entire interaction surface 3.

In addition, the secondary locations 11 and their associated acoustic responses A, B; are needed. These will be called excitation locations 11 in the following, as after exchanging the role between transducer and measurement at location, these secondary locations 11 are considered as if they were locations of external excitations. The excitation locations 11 are a set of points where acoustic responses are acquired experimentally following steps S10 and S11 as well as S13. According to a preferred variant, these secondary locations 11 are located in the border region of the interaction surface or just outside like illustrated in FIG. 2. By optimizing the spacing between secondary locations as well as their arrangement with respect to each other, the performance, e.g. precision and reduction of calculation power, of the method can be optimized, as will be described further down.

Figure 4:
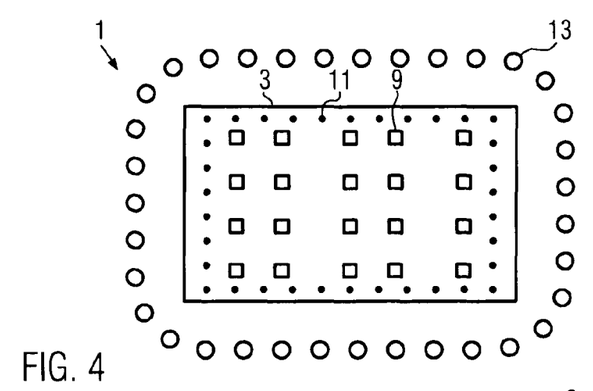
FIG. 4 illustrates different types of locations on the surface of the touch sensing device of the present invention playing a role in the method to determine acoustic responses.

Furthermore, in carrying out step S14, additional so called auxiliary locations 13 are necessary for carrying out the method. These auxiliary locations 13 are surrounding the database locations 9 and the excitation locations 11, as depicted in FIG. 4. Preferably, the locations 13 are outside the surface 3 and away from the excitation locations 11 and the database locations 9 on the surface 3 different to the excitation locations 11.

Steps S10 and S11 as well as S13 serve to provide for each excitation locations 11 the acoustic responses corresponding to a transfer function and representing the relation between the "virtual" mechanical excitation E (input) and the transducer's 5a, 5b responses (output) based on reciprocal principles as during the measurements, the bending waves are injected by the transducers and measurements are realized at the secondary locations 11.

Next, the wave number k of the excitation needs to be provided. This value can be either estimated from the geometry of the tactilized object, e.g. a plate shaped object or, for more complex geometries, be determined experimentally. Eventually, the estimation can be completed by an experimental part. The general expression of the wave number can be written as follows:

$$k = \frac{\omega}{c} \tag{6}$$

where $\omega=2\pi f$ is the angular frequency and f is the frequency. c is the speed at which the waves propagate in the material of the interaction surface 3 of device 1. In the case where the haptic interface can be considered as a thin plate (i.e. the ratio between the length of a side and the thickness is significantly greater than 1), the wave number can be expressed as follows:

$$k = \sqrt{\omega} \left[ \frac{12(1-\nu^2)\rho}{Eh^2} \right]^{1/4} \tag{7}$$

where E, $\nu$ and $\rho$ are material properties of the plate, being respectively the modulus of elasticity, the Poisson's ratio and the density. h is the plate thickness.

Then the determination of the WSM coefficients Q, which will be applied to the acquired acoustic responses of the excitation locations 11, requires knowing $u_n$ (cf. equation 4). These values $u_n$ are computed at the auxiliary locations 13, as defined above. Thus, during step S14, the Green's function (cf. equation 2) is computed between database locations 9 and auxiliary locations 13, these values being $u_n$.

The computation of the WSM coefficient can be summarized as follows:
Repeat for each frequency
  Repeat for each database location 9
    Repeat for each auxiliary location 13
      Determine the distance between the auxiliary location 13 and the database location 9
      Compute the Green's function [P] for this distance
      Repeat for each excitation location 11
        Determine a second distance between the auxiliary location 13 and the excitation location 11
        Compute the Green's function [D] for the second distance
      Compute the WSM coefficients $[B]=[D]^{-3}[P]$ Next, the acoustic responses at database locations 9 are computed by applying the WSM coefficients to the acoustic responses of the excitation locations 11.

Finally the acoustic responses previously computed in STEP S3 and S4 are transformed in acoustic signatures that are unique to each database point. All acoustic signatures associated to all database locations are gathered to form the lookup table. The acoustic signatures can represent a plurality of acoustic responses and/or phase difference values between two transducers.

Before determining the acoustic responses at the database locations 11, an additional step of selecting only relevant frequencies can be applied as a variant of this embodiment. The acoustic responses acquired at excitation locations during step S13 are functions of frequency. Depending on the acquisition parameters (sampling frequency, frame size), material properties and dimensions of the interaction surface 3, the acoustic responses at some frequencies may be not relevant because, for example, of a poor signal-to-noise ratio.

This additional but not mandatory step thus consists in selecting frequencies that are considered relevant by applying a criteria based, for example, on the coherence of the measurements. Noisy frequencies are thus rejected, avoiding the performances of the method to be decreased.

In the following, various possibilities to arrange the secondary locations 11 on the surface 3 according to variations of the invention will be described. The positioning of measurement locations actually plays an important role in the performances of the method according to the invention.

The main parameters are the geometry, thus how the secondary locations are arranged, and the appropriate number of secondary locations 11 at which measurements will take place. By optimizing these parameters, the goal of having sufficient precision on the final database to run the touch sensitive device 1 with the desired resolution concerning the touch sensitive interface 3 with as few measurement locations as possible, thus with reduces calculation power, can be achieved.

By applying the following rules and methods, according to the invention, a good compromise between the performances and the number of measurement locations 11 is achievable.

Figure 5A:
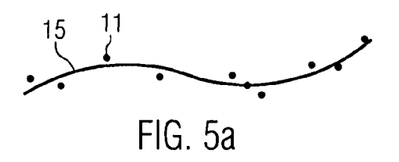
FIG. 5a illustrates a random arrangement of secondary locations on the surface.

The geometry formed by the secondary or excitation locations 11 can lead to the presence of fictive resonances during the numerical data treatment. These resonances have no physical meaning and are fully associated to the numerical formulation. A solution according to the invention consists in "breaking" the regular organization of the locations 11 by locating them randomly along a contour line 15, as depicted in FIG. 5a. In particular, the distance and orientation relationship between the neighbouring locations 11 are random or have no order.

Figure 5B:
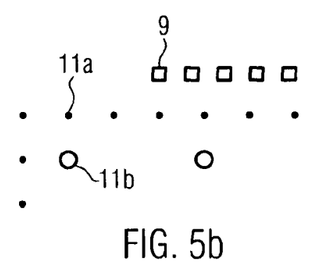
FIG. 5b illustrates the locations on the surface different to the transducer position formed in rows.

Another solution, according to the invention, consists in organizing the excitation locations 11 in a double layer network, as depicted in FIG. 5b. FIG. 5b shows that the secondary locations 11 are formed in at least two rows, in particular, such that the spacing between the locations 11a in a first row are different with respect to the spacing between the locations 11b in a second row. The locations 11a in the first row are evenly spaced with respect to each other and the locations 11b in the second row are evenly spaced with respect to each. Preferably the row, here 11a, with more reconstructed excitation locations, is positioned towards the database locations 9.

Not only the geometry itself needs to be taken into account, but also the spacing between two neighbouring excitation locations 11 has to be chosen. In order to have satisfying performances of the method, the choice of this spacing preferably follows a criterion based on the wavelength of the highest frequency of interest. If the spacing is too large, the acoustic responses in S14 will only be poorly predicted. If the spacing is too small, this will have no effect on the performance of the method, but will lead to a higher number of excitation locations 11, and thus to a longer acquisition time and a need for more computation power.

The smallest wavelength, corresponding to the highest frequency of interest, is expressed as follows:

$$\lambda_{min} = \frac{2\pi}{k_{max}} \quad (8)$$

Where $k_{max}$ is the wave number (cf. equation 6) of the highest frequency of interest.

It has been found that three to six excitation locations 11 per wavelength lead to good performances of the method. Below three excitation locations 11 per wavelength, the performances tend to decrease dramatically. In the case of the double layer organization of excitation locations 11 illustrated in FIG. 5b, this criterion should be preferably applied on the outer excitation locations 11b. Regarding the inner excitation locations 11a, it has been found that one inner point per every four outer points lead to good performances of the method.

Figure 6A:
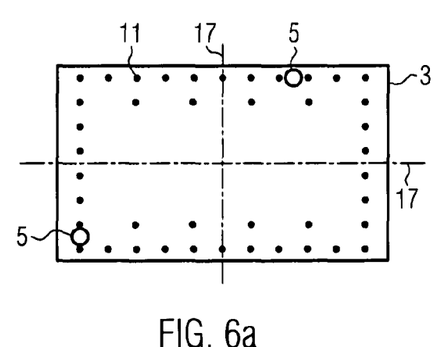
FIG. 6a illustrates the transducer located on the axes of symmetry of the surface of the touch sensing device.
Figure 6B:
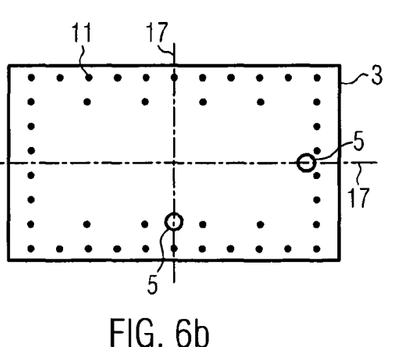
FIG. 6b illustrates the transducer located off the axes of symmetry of the surface of the touch sensing device.

A further possibility to improve the performance of the method is to take into account symmetry. FIGS. 6a and 6b illustrate two of the many possible arrangements of the transducers 5 on the surface 3 of the touch sensing device 1 in the presence of a symmetry axis. FIGS. 6a and 6b show a rectangular shaped surface 3 comprising the transducers 5. The transducers 5 of FIG. 6a are located at positions away from the axes of symmetry 17 of the surface 3. The transducers of FIG. 6b are located on the axes of symmetry 17 of the surface 3. When the transducers 5 are located on the axes of symmetry 17 of the surface 5, in particular one on each symmetry axis, the measurements need to be carried out only at the excitation locations 11 of every second quadrant defined by the two symmetry axis 17 of the surface.

Thus, with the benefit of symmetry of the surface 3, it is possible to reduce the number of locations 11 at which the measurements have to be carried out and, therefore, it is possible to reduce the number of acoustic responses that are to be determined during step S13. Consequently, the time required to determine the acoustic responses, in step 14, at the locations 9 on the surface different to the secondary locations 11 is reduced.

In this example, it is possible to reduce the number of excitation locations 11 by a factor 2, thus significantly reducing the time required to acquire the associated acoustic responses. However, this approach assumes that the boundary conditions of the haptic interface are also symmetric. Depending on the shape of the interaction surface and the device 1 itself other symmetry rules may apply leading to similar effects on the amount of excitation locations 11 depending on the position of the transducers.

Figure 7:
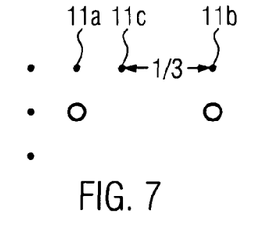
FIG. 7 illustrates an acoustic response interpolation at the locations on the surface different to the transducer position.

Another way to optimize the performance of the method is to take advantage of interpolation methods. They consist in computing acoustic responses on some excitation locations 11 themselves, as depicted in FIG. 7. For example, it is possible that, in the case of a set on N-1 excitation locations 11 which respect the frequency criteria set-up above except between two points 11a, 11b (i.e. presence of a "hole" in the contour), it is possible to estimate the acoustic response of this missing point 11c with an acceptable accuracy. This variant can play an important role in case the method is not only used to create the lookup table but also to carry out an re-calibration procedure based on the update of the set of acoustic responses at the contour point locations. This way actually, for only about one half of excitation locations acoustic responses, would have to be first acquired to do a partial update. Then, interpolation would complete the update by replacing obsolete acoustic responses sequentially, without having to carry out the experimental measurements for these locations.

Of course the various embodiments described above can be combined in any combination to further optimize the method according to the invention.

Figure 8:
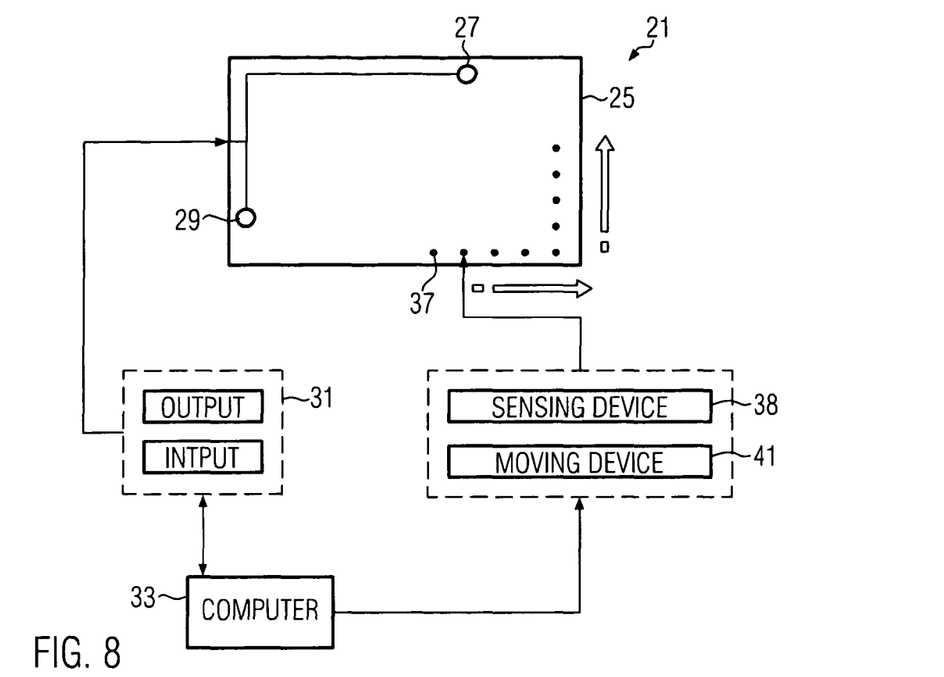
FIG. 8 illustrates a system for calibrating a touch sensing device according to a third embodiment of the present invention.

FIG. 8 illustrates the global architecture of a touch sensitive device calibrating system 21 according to a second embodiment of the invention which is able to speed up the lookup table/database creation process to obtain the predetermined set of acoustic signatures. The touch sensitive device 23 which can be calibrated with system 21, can be the one illustrated in FIG. 2, thus with a control system configured to establish the lookup table, but could also be any other one with an interaction surface 25 and transducers 27, 29 having the same properties as above.

The system 21 comprises a front end device with an input/output unit 31, in particular an analog input/output unit 23. The input/output unit 31 communicates with the transducers 27, 29 directly or via the control unit 7 (see FIG. 2) and thus provides the driving or actuating input concerning the acoustic signals to be injected by the transducer 27 or 29 in step S10. It may carry out the following actions: signal conditioning of the analog inputs, like amplification, filtering, automatic gain control, analog-to-digital conversion of the analog inputs, digital-to-analog conversion of analog outputs, signal conditioning of the analog outputs, like amplification and filtering. The unit 31 is furthermore in connection with an analysing means 33, here a computer, for data transfer and may provide an interface to configure the system 21.

The driving or actuating input is configured to transmit the mechanical excitation in a broad frequency range, at least corresponding to the range of interest for touch sensitive applications based on the detection of acoustic signals. A preferred frequency range is the audio frequency ranging from about 0 to about 20 kHz, however frequencies of up to 40 kHz or even 100 kHz could also be considered depending on circumstances.

The system 21 further comprises a sensing means 37, like a vibrometer, e.g. a non contact laser based interferometer or an atomic force microscope, to sense the resulting vibrations at an secondary location 37 (corresponding to secondary locations 11 in the embodiment of FIG. 2) of the interaction surface 25.

In addition, a moving device 41 is provided to move the sensing device 39 to the excitation location/s 37 where the excitation has to be transmitted to the interaction surface 25. This device 41 is configured to move fast from one location 37 to another, with a high positioning accuracy. This can be achieved with a robot with at least 3 axes of displacement or a scanning vibrometer.

The input/output unit 31 and the excitation means 39 are in connection with the analysing means 33, here the computer, which controls the system 21. The analysing means 33 carries out at least one of the following activities: it provides an interface with the front-end device, the input/output unit 31 to configure and to collect data coming from the emitters, namely the transducers 27, 29 but also to collect data from the sensing device 39, and to communicate instructions to the moving device 41 to drive the moving device to the correct location.

The main task of the analysing means 33 is to apply the method as described above to build up the lookup table. The computer uses the method presented in this document that enables to determine acoustic signature at any point over the area of the interaction surface, from a set of acoustic responses acquired on the borders of this area, wherein the excitations are reconstructed based on time reversal principles out of the sensed signals and the injected bending waves.

Figure 9:
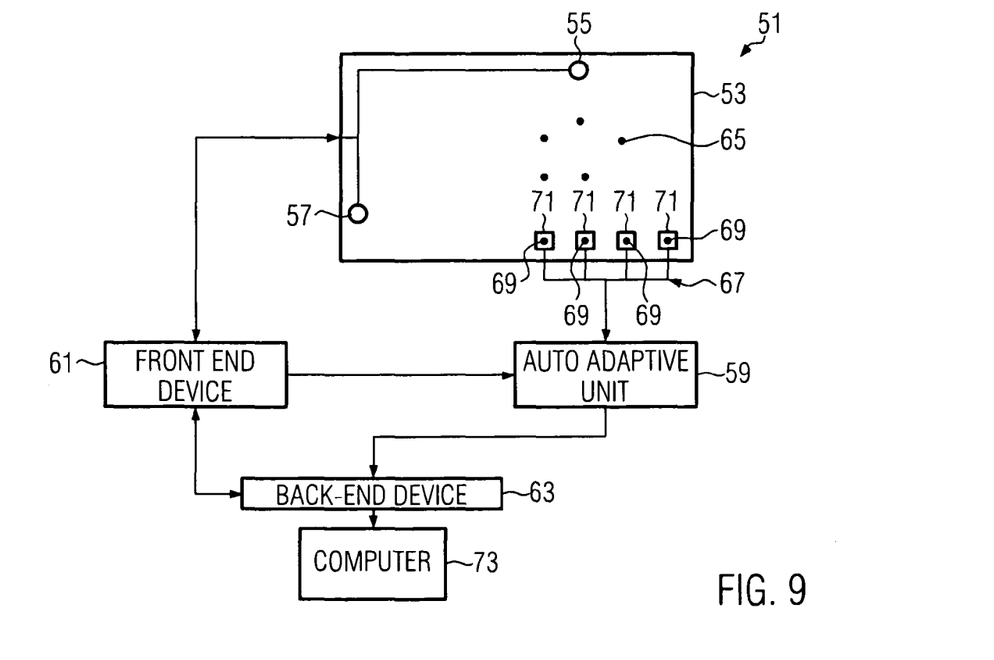
FIG. 9 illustrates another touch sensing device according to a fourth embodiment of the present invention.

FIG. 9 depicts the global architecture of a third inventive embodiment. It illustrates another touch sensing device 51 with an interaction interface 53, with the same properties as in the first or second embodiment and transducers 55, 57. In addition to the features described above with respect to the first and second embodiment (see also FIG. 2), this device furthermore comprises a re-calibration unit or auto adaptive unit 59.

The touch sensing device 51 of the third embodiment also comprises a front-end device 61 which is part of the control means according to claim 12 and that provides a treatment of the signals received from the transducers 55, 57, like amplification, filtering, automatic gain control, analog-to-digital conversion. The digitized data is provided at an output interface towards the auto-adaptive unit 59 and a back-end device 63. Other features of the front-end device could be a configuration interface and a power management.

The back-end device 63 is configured to obtain the localization of a user event, like a touch, a drag & drop, . . . , out of the signals previously acquired by the front-end device 61 using a technology like described in the introduction above and thus based on the acoustic signals received which are compared with the predetermined set of acoustic signatures stored in a lookup table or database.

The re-calibration unit or auto adaptive unit 59 fulfils two functions in this embodiment: First of all, at the first use, an auto-calibration is carried out to generate the lookup table with the acoustic signatures. This can be done at the first initialisation or any time the back end device 63 instructs the auto adaptive unit 59 to do so. Second, the component is configured to automatically recalibrate the lookup table of the interaction surface 53 upon identification of a change e.g. due to aging, a certain temperature range, following integration of the device into another device or any other change that may affect the mechanical and thus the acoustic behaviour of the interaction surface 53. The device 51 can also be configured to carry out the re-calibration upon request from a user or from the back-end device. It could also be carried out regularly, e.g. on a periodical schedule.

The auto-adaptive device 59 uses the method described above with respect to the first embodiment and which can determine acoustic responses and thus also signatures at any location 65 over the area of the interaction surface 53, from a set of reconstructed acoustic responses experimentally acquired on the borders 67 of this area. To be able to measure the vibrations at secondary location 69, at least one sensor 71 (four sensors in this embodiment) is attached to the backside of the interaction surface 53. These sensors are to sense resulting vibrations of signals being injected by the transducers 55 and 57 as described above. The auto-adaptive device can be a standard microcontroller and eventually integrated into the front-end device 61, the back-end device 63 or on an ASIC chip integrating the three functions.

Finally, the touch sensitive device 51 can be connected to a computer 73 or any other suitable electronic device, e.g. a handheld electronic device, which receives the locations of touch events or impacts from the touch sensitive device as input values which can be used to control applications of the computer 73.

The auto-calibration feature of the touch sensitive device 51 functions the following way: At the first switching on of the system, the auto-adaptive device 59 is in charge to build the lookup table in order to turn the surface of the object into a touch sensitive interaction surface 53. This process is the following: a) the front end device 59 sends a signal to each transducer 55, 57 iteratively to make the object vibrate, b) the acoustic responses based on the signals sensed by sensors 71 are iteratively acquired through the auto adaptive unit 59, based thereon c) the auto-adaptive device 59 builds the acoustic signature subset corresponding to the sensors' 71 locations using reciprocal principles, d) the auto-adaptive device 59 builds the lookup table for locations 65 from the subsets of acoustic signatures determined for all sensor locations 71 and e) the back-end device 63 stores it to its memory, finally f) the auto-adaptive device 59 informs the back-end device 63 that the system is ready.

According to a variant, instead of an iterative approach, the signals could be injected from the transducers at the same time, in case the injected signals are uncorrelated.

The re-calibration feature of the touch sensitive device 51 functions the following way. During the whole life of the system, the auto-adaptive device 59 is in charge to monitor the integrity of the interaction surface 53 to identify potential drifts due to a change in environmental conditions and usage. As the back-end device 63 is permanently waiting for user events, the re-calibration process should preferably run in the background, in order to minimize interruptions of the recognition process. For instance upon detection of a drift or at the lapse of a predetermined recalibration duration, the re-calibration is trigged. After such a triggering, the back-end device 63 stops and the auto-adaptive device 59 can send signals to the front end device 61 to drive the transducers 55 and 57 to inject bending waves. In fact, the process to re-calibrate and update the lookup table does not need to be in real time, it can be performed in the background without having to interrupt a user. Thus, the signal emission can be interrupted by the back-end device 63 at any time, e.g. in case of a sudden user event, and then be continued without losing the re-calibration computation done before the interruption. During re-calibration, essentially the same steps are carried out as during initialization. To update the lookup table, the old signatures are overwritten with the new ones. Eventually a trace can be kept of the changes to be able to analyze the changes, e.g. to identify the source of a change in the lookup table.

The embodiments of this invention provide a method that is used to determine acoustic signatures at any point over an area to be turned into a sensitive object, from a smaller set of acoustic responses acquired at other locations, in particular on the borders of this area. With this inventive concept, the following advantages compared to the prior art can be achieved: It can reduce the number of acoustic responses necessary to acquire the acoustic signatures, namely typically to a few hundreds or even less instead of several thousand, it enables the fast acquisition of the lookup table, namely a few minutes instead of several hours, it furthermore enables to have a dedicated lookup table for each piece and it functions with any kind of material (glass, plastic, wood, metals, etc.) and shape (flat & curved panels, complex 3D surfaces). In addition, with the method, the integration constraints (as each piece has its dedicated lookup table, sensitivity to integration constraints is lower) can be lowered. A further major advantage is that it becomes possible to carry out auto-calibration (i.e. it is capable of building its own lookup table) and re-calibration (i.e. it is capable of adapting its own lookup table if required, to compensate, for example, wear, scratches, aging, temperature, integration drifts). By applying reciprocal principles one does not have to provide external excitations on the surface of the device, but non contact measurements can be carried out to get access to the desired wave parameters, the injection is done by the transducers, usually used for sensing the acoustic signals.

The second and third embodiment are explained for two transducers, nevertheless the invention can be carried out with only one transducer or more than two.

The invention claimed is:

1. A method for determining an acoustic response attributed to a location of an impact, the method comprising:
   a) injecting a predetermined acoustic bending wave by at least one transducer at a transducer position on a surface of an object;
   b) sensing a bending wave parameter at a secondary location from among a plurality of secondary locations on the surface, the secondary location being different to the transducer position;
   c) determining a first acoustic response based on the sensed bending wave parameter and properties of the predetermined acoustic bending wave as if the injection took place at the secondary location and the sensing took place at the transducer position based on reciprocity principles;
   d) determining a second acoustic response attributed to at least one database location on the surface different to secondary location and different to the transducer position, the second acoustic response being based on the first acoustic response;
   e) determining a first representative function based on a distance between an auxiliary location from among a plurality of auxiliary locations and the at least one database location,
   the plurality of auxiliary locations being positioned away from the secondary location and the at least one database location;
   f) determining a second representative function based on a distance between the auxiliary location and the secondary location;
   g) computing a ratio between the first representative function and the second representative function;
   h) repeating step e) for each auxiliary location of the plurality of auxiliary locations and for each database location; and
   i) repeating step f) for each secondary location of the plurality of secondary locations.

2. The method according to claim 1, wherein the plurality of secondary locations are provided such that spacing $\lambda$ between two neighboring secondary locations satisfy a relation of $\lambda \leq 1.2$ A, wherein:
A is proportional to $$\frac{2\pi}{\sqrt{\omega}} \left[ \frac{12(1-v^2)\rho}{Eh^2} \right]^{-1/4} ;$$

$\omega$ is angular frequency of the predetermined acoustic bending wave from the transducer; and
E, v, $\rho$ and h are modulus of elasticity, Poisson's ratio, density, and thickness of the object, respectively.

3. The method according to claim 2, wherein the plurality of secondary locations are provided such that the spacing $\lambda$ satisfy the relation of 0.5 A$\leq\lambda\leq$1.2 A.

4. The method of claim 3, wherein the plurality of secondary locations are provided such that the spacing $\lambda$ satisfy the relation of 0.9 A$\leq\lambda\leq$1.0 A.

5. The method of claim 2, wherein the plurality of secondary locations are provided such that the spacing $\lambda$ satisfy the relation of 0.9 A$\leq\lambda\leq$1.0 A.

6. The method according to claim 1, wherein steps a) to c) are carried out for two or more transducers positioned at different transducer positions.

7. The method according to claim 6, wherein steps a) to c) are carried out for one transducer after another transducer or at the same time.

8. The method according to claim 1, wherein the step of injecting the predetermined acoustic bending wave comprises:
providing a plurality of bending waves with different frequencies within a predetermined frequency range; and
sensing signals for each one of the bending waves of the plurality of bending waves with different frequencies.

9. The method according to claim 1, wherein step b) comprises sensing at the secondary location with a vibration measuring device.

10. The method according to claim 1, wherein steps a) to c) are carried out for at least two secondary locations from among the plurality of secondary locations.

11. The method according to claim 1, wherein steps a) to c) are realized for the secondary location that is positioned in a border region of the surface of the object or is positioned outside the border region.

12. The method according to claim 1, further comprising:
   j) selecting acoustic response, determined during step c) for carrying out step d), that satisfy predetermined criteria concerning at least one of signal-to-noise ratio and coherence of measurements made at the secondary location.

13. The method according to claim 1, wherein the plurality of auxiliary location are outside the surface and away from plurality of secondary locations and the at least one database location.

14. The method according to claim 1, wherein the plurality of secondary locations comprises between three to six secondary locations per wavelength of the predetermined acoustic bending wave.

15. The method according to claim 1, wherein the at least one transducer is located on the axes of symmetry of the surface of the object.

16. The method according to claim 1, wherein:
the surface comprises a rectangular shape,
the at least one transducer is located on at least one of the axes of symmetry of the rectangular surface; and
at least one secondary location from among the plurality of secondary locations is located at every second quadrant of the rectangular surface.

17. The method according to claim 1, wherein the plurality of secondary locations on the surface different to the transducer position are randomly arranged.

18. The method according to claim 1, wherein:
the plurality of secondary locations are formed in at least two rows; and
a first spacing between locations, from among the plurality of secondary locations, in a first row are different with respect to a second spacing between other locations, from among the plurality of secondary locations, in a second row.

* * * * *